United States Patent [19]

Nievoll

[11] Patent Number: 5,565,390
[45] Date of Patent: Oct. 15, 1996

[54] USE OF A REFRACTORY CERAMIC BRICK FOR LINING CEMENT ROTARY KILNS

[75] Inventor: Josef Nievoll, Leoben, Austria

[73] Assignee: Veitsch-Radex Aktiengesellschaft fur feuerfeste Erzeugnisse, Vienna, Austria

[21] Appl. No.: 337,956

[22] Filed: Nov. 10, 1994

[30] Foreign Application Priority Data

Nov. 11, 1993 [DE] Germany ............... 43 38 484.6

[51] Int. Cl.[6] ............................................. C04B 35/04
[52] U.S. Cl. ............................................. 501/120; 501/121
[58] Field of Search .................................. 501/120, 121

[56] References Cited

U.S. PATENT DOCUMENTS

| | | | |
|---|---|---|---|
| 4,648,954 | 3/1987 | Henslee et al. ............... | 501/120 |
| 4,729,974 | 3/1988 | Nazirizadeh et al. .......... | 501/120 |
| 4,780,434 | 10/1988 | Watanabe et al. ............. | 501/120 |
| 4,833,109 | 5/1989 | Macey et al. ................. | 501/120 |
| 4,971,934 | 11/1990 | Schiavi et al. ................ | 501/120 |
| 5,021,374 | 6/1991 | Macey .......................... | 501/120 |
| 5,344,802 | 9/1994 | Knauss .......................... | 501/120 |

*Primary Examiner*—Karl Group
*Assistant Examiner*—Michael Maicheschi
*Attorney, Agent, or Firm*—John F. A. Earley; John F. A. Earley, III

[57] ABSTRACT

The present invention pertains to the use of a refractory ceramic brick based on MgO containing 3% to 23% of a pre-synthesized MgO×$Al_2O_3$ (MA spinel) with an $Al_2O_3$ content of 75 to 95 wt. % for lining cement rotary kilns.

8 Claims, No Drawings

USE OF A REFRACTORY CERAMIC BRICK FOR LINING CEMENT ROTARY KILNS

The present invention pertains to the use of a refractory ceramic brick for lining cement rotary kilns.

Mainly basic refractory bricks based on MgO have been used to line cement rotary kilns during the past decades.

The fact that the modulus of elasticity of the bricks is relatively high and that the bricks have only a low structural flexibility is considered to be a decisive disadvantage of all-magnesia bricks.

According to DE 36,17,904 C2, the modulus of elasticity of all-magnesia bricks is 60 to 100 kN/mm$^2$.

It has also been known that chrome ore improves the spalling resistance of magnesia bricks. However, products containing chrome ore lead to toxic reaction products.

Alternative products are available in magnesia spinel or magnesium-alumina bricks, which do not cause any environmentally harmful emissions. To increase the resistance of the MgO×Al$_2$O$_3$ spinel (hereinafter called MA spinel) to reactions with CaO and basic substances with a CaO/SiO$_2$ ratio of >1.87 and thus to retard the formation or lime-containing decomposition products and/or to reduce the amount of such decomposition products formed, DE 36,17,904 C3 proposes a refractory composition for a refractory brick based on magnesia spinel for lining rotary kilns for the cement industry, which contains at least 50 wt. %, but less than 86.1 wt. % of sintered magnesia, more than 13.9 and up to 50 wt. % of spinel clinker (stoichiometric MA spinel) as the Al$_2$O$_3$ carrier relative to the total composition, and 1 to 2 wt. % of zirconia in the particle size range of <0.06 mm relative to the total amount of spinel clinker and sintered magnesia, which is taken for 100 wt. %. Consequently, defined weight percentages of a pre-synthesized stoichiometric MA spinel are added to a brick based on MgO, together with zirconia.

EP 0,531,130 A2 discloses a process for preparing a refractory product which consists of 60 to 93 wt. % of coarse-grained MgO, 5 to 30 wt. % of coarse-grained stoichiometric MA spinel and 1 to 15 wt. % of finely dispersed Al$_2$O$_3$, as well as various other additives. The refractory product thus prepared is said to have improved hot strength, especially at temperatures above 2,300° F., and to be used in cement rotary kilns.

The addition of a finely dispersed aluminate component is considered to be an essential factor. The finely dispersed Al$_2$O$_3$ is said to improve the ceramic binding and to provide a source of aluminate for the in situ formation of (stoichiometric) MA spinel.

DE 35,32,228 C2 discloses a refractory composition consisting of 10 to 30 parts by weight of an MA spinel, which contains 40 to 70 wt. % of Al$_2$O$_3$ and 25 to 60 wt. % of MgO, as well as of 90 to 70 parts by weight of a magnesium oxide material for metallurgical purposes. It is pointed out in that patent specification that the Al$_2$O$_3$ content must not be less than 40 wt %, because this would be disadvantageous for the spalling resistance of the refractory material. An Al$_2$O$_3$ content above 70 wt. % is also described as disadvantageous, because too many corundum crystals would be formed around the spinel crystal bodies, so that the corrosion resistance of the refractory material would not be able to be improved.

DE 34,45,482 A1 also discloses a refractory brick based on sintered magnesia and MA spinel. According to Table II, the Al$_2$O$_3$ content in the spinel used is 66 2 wt % i.e., below that of a stoichiometric MA spinel containing 71.8 wt. % of Al$_2$O$_3$. The selection of materials known from DE 34,45,482 A1 leads to a refractoriness under load of higher than 1,740° C. and to a flow under load of −3 to −5% at 1,400° C. after 24 hours under a load of 0.2 N/mm$^2$.

The ALCOA prospectus "New Spinel Materials for Refractory Linings in the Steel-Making Sector" originated from a paper presented at the Refractory Colloquium held in Aachen in October 1992. New spinel-containing materials for refractory linings for metallurgical application were reported in that paper. The prospectus pertains especially to casting slips for steel (casting) ladles using superstoichiometric MA spinels, e.g., those containing 78 wt. % and 90 wt. % of Al$_2$O$_3$, wherein the MA spinel is said to be used in amounts of 23 to 25 wt. %. The casting slips are said to lead especially to an improvement in durability with respect to slags. The use of a superstoichiometric spinel in combination with reactive alumina is presumed to be absolutely necessary.

The basic task of the present invention is to show a possibility of improving the spalling resistance and the structural flexibility of refractory ceramic bricks based on MgO for lining cement rotary kilns.

Therefore, the present invention proposes the use of a refractory ceramic brick based on MgO containing between 3 and 23 wt. % of a presynthesized MgO×Al$_2$O$_3$ (MA) spinel with an Al$_2$O$_3$ content between 75 and 95 wt. % for lining cement rotary kilns.

It was found that the use of relatively small amounts of a superstoichiometric MA spinel in bricks based on MgO leads to a characteristic reduction in the modulus of elasticity of the bricks and thus to a markedly improved stress reduction capacity in the bricks.

It was determined in experiments that the superstoichiometric MA spinel is converted into stoichiometric spinel and corundum (Al$_2$O$_3$) during the firing of the bricks (preferably between 1,450 and 1,550° C.). The corundum is quasi protected from further reaction with the MgO matrix by the superstoichiometric MA spinel. At the same time, shrinkage of the MA spinel grains added takes place during the firing of the bricks. This leads to the MA spinel grains and the MgO matrix being separated from one another by narrow cavity aureoles after the firing.

This phenomenon also explains why even relatively low weight percentages of, e.g., 3, 5 or 10 wt. % of the superstoichiometric MA spinel are sufficient to achieve the desired effects. Due to the cavities, the brick is able to absorb increased amounts of thermal and mechanical stresses, because when a crack develops, the cavity areas hinder or completely prevent its expansion. This ultimately leads to an improved structural flexibility and higher spalling resistance, which are of great significance for the said application.

This structural aspect, which is essential for the use of the bricks for lining cement rotary kilns, can be achieved only if a superstoichiometric MA spinel with the Al$_2$O$_3$ contents indicated is used. In contrast, the addition of finely dispersed alumina particles to a coarse-grained, stoichiometric MA spinel, as is proposed in EP 0,531,130 A2, leads to the opposite result, namely, to the in situ formation of excess Al$_2$O$_3$ particles with the MgO matrix material to form MA spinel.

Consequently, the structure becomes denser rather than being interrupted by cracks (cavities), as it happens within the framework of the use according to the present invention.

The advantage that can be achieved by the use of a superstoichiometric MA spinel should be surprising in light of the ALCOA prospectus, because the use of a superstoichiometric MA spinel exclusively for metallurgical applications is described there, on the one hand, and, on the other hand, the combination of the superstoichiometric MA spinel with reactive alumina is presumed to be absolutely necessary.

According to an embodiment, an MA spinel with an Al$_2$O$_3$ content of 75 to 90 wt. % is used.

As was mentioned above, the weight percentage of the superstoichiometric MA spinel may be relatively low, and it equals only 5 to 15 wt. % relative to the total brick mixture according to one embodiment.

The superstoichiometric MA spinel may be either a sintered spinel or a molten spinel. Aside from the different weight percentages of MgO and $Al_2O_3$, the manufacturing processes known for stoichiometric MA spinels may be used to prepare the superstoichiometric MA spinel. Possible manufacturing processes are described in: Schulle: *Feuerfeste Werkstoffe* [Refractory Materials], Deutscher Verlag für Grundstoffindustrie GmbH, Leipzig, 1st edition, 1990, p. 247.

Other features of the present invention become apparent from the features of the subclaims as well as from the other application documents.

The present invention will be explained in greater detail below on the basis of various exemplary embodiments.

Table 1 shows three formulas, of which formula A is used as a comparison example and pertains to a brick based on MgO containing 4.5 wt. % of stoichiometric spinel.

The stoichiometric spinel in formula A was replaced with 7.5 wt. % of MA spinel containing 78 wt. % of $Al_2O_3$ in formula B and with 6.5 wt. % of an MA spinel containing 90 wt. % of $Al_2O_3$ in formula C.

The physical test values prove that the stress reduction capacity at 1,100° C./1 Nm after two hours (in %) was able to be markedly improved with bricks according to the present invention, and the modulus of elasticity of some of the bricks according to the present invention is markedly lower than that of reference sample A.

| Brick | | A | B | C |
|---|---|---|---|---|
| Corundum (wt. %) | (wt. %) | 3 | | |
| Stoichiometric spinel | " | 4.5 | | |
| Superstoichiometric spinel 78 | " | | 7.5 | |
| Superstoichiometric spinel 90 | | | | 6.5 |
| Rest: MgO + impurities | | | | |
| Firing temperature, ca. °C. | | 1,500 | | |
| Physical test values | | | | |
| Open porosity, vol. % | | 16.8 | 16.8 | 17.4 |
| Stress reduction capacity at 1,100°C./1 Nm - after 2 hours, % | | 42.9 | 50.9 | 59.9 |
| Modulus of elasticity, $kN/mm^2$ | | 29.9 | 28.1 | 25.6 |

I claim:

1. Method of lining a cement rotary kiln comprising the steps of preparing a refractory ceramic brick based on MgO containing 3 to 23 wt. % of a pre-synthesized MgO× $Al_2O_3$ (MA) spinel with an $Al_2O_3$ content of 78 to 95 wt. %, and lining the kiln with said refractory ceramic bricks.

2. Method in accordance with claim 1, wherein the $Al_2O_3$ content in the MA spinel is 78 to 90 wt. %.

3. Method in accordance with claim 1, wherein the amount of MA spinel in the brick is 5 to 15 wt. %.

4. Method in accordance with one of the claim 1, wherein the brick was fired at 1,450°–1,550° C.

5. Method in accordance with one of the claim 1, wherein the MA spinel is a sintered spinel.

6. Method in accordance with claim 1, wherein the MA spinal used for preparing said brick has a grain fraction of less than 3 mm.

7. Method in accordance with claim 1, wherein the MgO used for preparing said brick has a grain fraction of less than 5 mm.

8. Method of lining a cement rotary kiln comprising the steps of preparing a refractory ceramic brick based on MgO containing 3 to 23 wt. % of a pre-synthesized MgO× $Al_2O_3$ (MA) spinel, wherein the $Al_2O_3$ content in the MA spinal is 78 to 90 wt. %, wherein the amount of MA spinal in the brick is 5 to 15 wt. %, wherein the brick was fired at 1,450°–1,550° C., wherein the MA spinel is a sintered spinal, wherein the MA spinal used for preparing said brick has a grain fraction of less than 3 mm, and wherein the MgO used for preparing said brick has a grain fraction of less than 5 mm and lining the kiln with said refractory ceramic bricks.

\* \* \* \* \*